United States Patent [19]

Saffran

[11] 4,372,895

[45] Feb. 8, 1983

[54] DISC FOR AERATION OF SEWAGE

[75] Inventor: Edward P. Saffran, Waukesha, Wis.

[73] Assignee: Envirex Inc., Waukesha, Wis.

[21] Appl. No.: 144,480

[22] Filed: Apr. 28, 1980

[51] Int. Cl.³ .............................. B01F 9/08; C02F 3/18
[52] U.S. Cl. ..................................... 261/92; 210/150;
    210/926; 210/219
[58] Field of Search .................... 210/17, 150, 151, 14,
    210/194, 926, 219; 261/92

[56] References Cited

U.S. PATENT DOCUMENTS

| 3,744,774 | 7/1973 | Huisman et al. | 261/92 |
| 3,904,525 | 9/1975 | Rosenberg | 261/92 |
| 4,149,972 | 4/1979 | Iwai et al. | 210/150 |

FOREIGN PATENT DOCUMENTS 1008191  4/1977  Canada .................................. 210/150

*Primary Examiner*—Benoît Castel
*Attorney, Agent, or Firm*—John M. Neary; Vance A. Smith; Aaron L. Hardt

[57] ABSTRACT

Each face of the disc for sewage aeration includes a multiplicity of recesses. The recesses of one face have no communication with those of the other face and are precisely dimensioned so that the sewage, which is essentially water, flows into and out of each recess without leaving an accumulation of deposits in the recess. This is accomplished with no reduction of and possibly an increase in the aeration efficiency of the disc.

6 Claims, 7 Drawing Figures

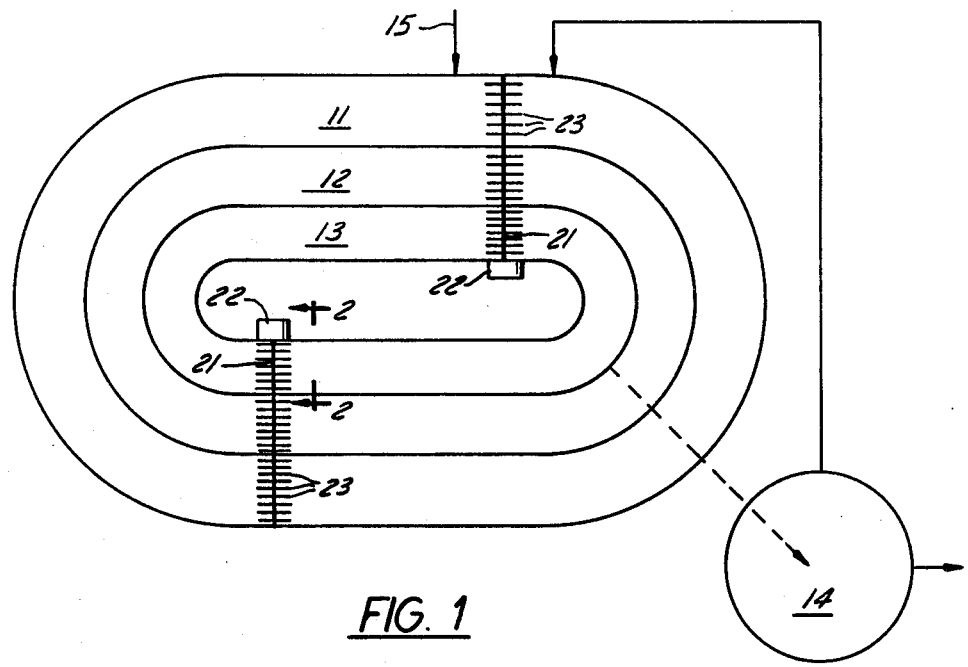
FIG. 1
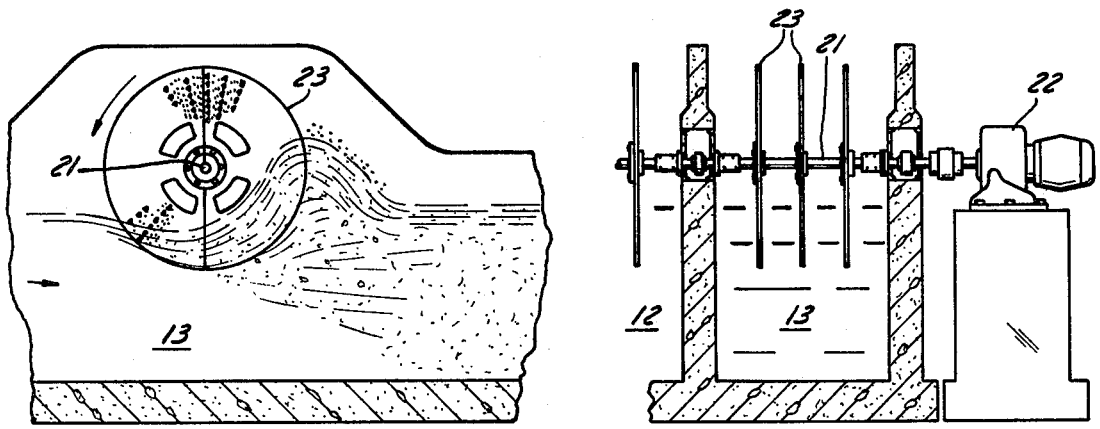
FIG. 3
FIG. 2

DISC FOR AERATION OF SEWAGE

BACKGROUND OF THE INVENTION

The treatment of sewage by aeration may be carried out with a series of discs or paddles mounted on a horizontal shaft rotating just above the surface of the sewage. A particular type of sewage treatment plant for the extended aeration of the sewage or which may carry out the activated sludge process with such discs comprises a series of channels which are usually concentric for construction economy. The discs have two main functions, namely to inject diffused air into the mixed liquor in the channels and to circulate the mixed liquor in the channels to prevent settling and provide mixing. As each disc rotates, the mixed liquor which wets the disc is also aerated by the contact aeration process. This is of a relatively lesser effect but is significant to the present invention.

The present invention is an improvement over a preferred type of aeration disc which has a multiplicity of perforations of a certain size. Such discs may be designed to operate with great efficiency.

As each disc rotates, each portion having a given perforation or hole is repeatedly exposed to the air and then submerged in the mixed liquor. The rotational speed of the disc is such that the air in the hole is carried to below the surface of the mixed liquor where it is displaced by the liquor and optimally leaves the hole as a series of very small bubbles. Some of the oxygen of the air at the interface of each air bubble and the liquor is dissolved in the water before the bubble breaks at the liquid surface. The mentioned efficiency is the rate of such oxygen transfer relative to the horsepower required to rotate the shaft and may be precisely measured.

It is well known that the particularly small size of the bubbles is an important factor because of their greater surface area for a given volume of air and that if the air in leaving a given hole is sheared into small bubbles by the liquor passing over the disc, its efficiency is greatly improved.

The exact flow pattern of the liquor which displaces the air from a given hole has not been determined, but can be conjectured. Assuming absolute symmetry, liquor enters the leading portion of the hole in opposed directions from both sides of the disc at a given rate and the air similarly leaves the trailing portion of the hole in opposite directions from both sides of the disc at the same rate. Assuming no symmetry, the liquor enters the hole from one or the other side of the disc and pushes the air out of the hole on the opposite side of the disc. Whatever occurs, of course, is generally of some intermediate nature. In any case, the air should be displaced well before the hole again emerges from the liquor and it may be that some movement of the liquor through the hole occurs during each submersion. While such flow is conjectured, it seems to be indicated by the problem which has developed in the treatment of sewage having an appreciable amount of suspended material such as hair and stringy debris. Apparently with each submersion, there is a significant flow of liquor through the hole probably after the air has been displaced and no doubt most of the material carried by the flow is carried through the hole. Nonetheless, some amount, probably first the longer hairs and the like, initially become draped over both sides or faces of the disc. This is indicated by the fact that after several weeks of operation many holes are plugged by hairs, strings and the like, although significantly fewer holes appear to be partially plugged at any given time. The plugged and partially plugged holes may be readily observed when the discs are not rotating and of course the effect is to drastically reduce the efficiency of the disc. Accordingly, the object of the present invention is to prevent such plugging of the holes without in any way decreasing the oxygen transfer efficiency of the disc, and possibly with some increase in such efficiency. Another object of the invention is to provide an aeration disc with recesses in each face which provide high efficiency but which are resistant to plugging by suspended material of any sort.

Another object of the invention is to provide recesses in an aeration disc which may be further provided also with projecting nodules which also entrain air and in particular increase the impelling action of the discs. Another object of the invention is to increase the surface area of the disc and the efficiency of the disc by contact aeration, at least to the extent that the recesses of a given disc may have somewhat less total volume than similar holes would have.

SUMMARY OF THE INVENTION

An aeration disc is provided with recesses in each face. They are generally round, in the order of three-quarter of an inch (19.05 mm) in diameter and three-eighths of an inch (9.53 mm) in depth. Each disc may optionally also have projections which supplement the air entrainment provided by the holes. The total area of the disc for contact aeration purposes include the inner face of each recess. In a preferred embodiment of the invention, the disc appears to be provided with a multiplicity of holes each of which is simply divided by a partition. The improvement of the present invention must, of course, have reference to the nearest comparable prior art which specifically and as indicated comprises such a disc without the mentioned partitions.

DESCRIPTION OF THE SEVERAL VIEWS OF THE DRAWINGS

FIG. 1 shows in plan the outline of concentric channels in which the sewage is successively aerated and treated.

FIG. 2 is a section taken on line 2—2 of FIG. 1 and illustrates the operation of the discs in the channel.

FIG. 3 is a side elevation of one of the discs of the outer channel of FIG. 1.

DESCRIPTION OF THE PREFERRED EMBODIMENT

Figure 4:
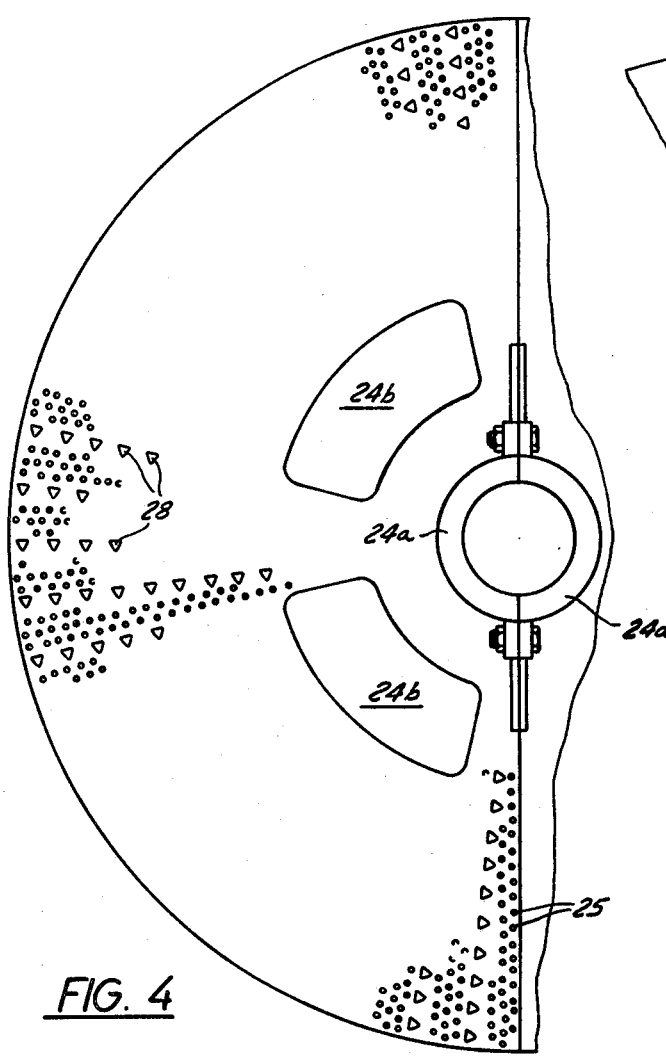
FIG. 4 is an enlarged side view of one-half of a disc.

The treatment plant shown in FIGS. 1-3 comprises three concentric channels 11-13 and the settling tank 14. The inlet 15 introduces the raw sewage into channel 11. Several spaced ports, not shown, in the intermediate walls allows the flow to pass successively into channel 12 and channel 13. The treated waste is then in good condition for settling in tank 14 and to provide a clear effluent which may be discharged with a minimum, if any, of additional conditioning.

The two shafts 21 are diametricaly disposed with respect to the channels and extend across the channels as shown in part in FIG. 2. Shaft 21 is driven by the motor 22 and carries a number of discs 23 which are assembled and secured at spaced intervals on the shaft which may be segmented for assembly purposes.

Three such discs are shown mounted on shaft 21 in channel 13. A greater number of discs in the outer channels 12 and 11 are provided as is generally required. A side view of one of discs 23 is shown in FIG. 3 which is a section normal to the axis of shaft 21.

Disc 23 preferably comprises an assembly of two or more sections, such as the section 24 shown in FIG. 4. The sections permit each of the discs to be assembled on shaft 21 after the shaft is in place across the channels. Section 24, as shown, is of an injection molded construction. Various thermoplastic materials are available such as glass fiber filled polypropylene or a polystyrene structural foam having good resistance to weathering.

The section 24 includes the semi-circular flange 24a which is enlarged for strength and matches a similar flange of the complementary section which completes the disc. The two flanges when secured together with bolts, not shown, are arranged to fit tightly around shaft 21 and secure the completed disc 23 to the shaft. The arcuate openings 24b immediate to flange 24a reduce the weight of the section but do not reduce the effective area of the discs.

Figure 5:
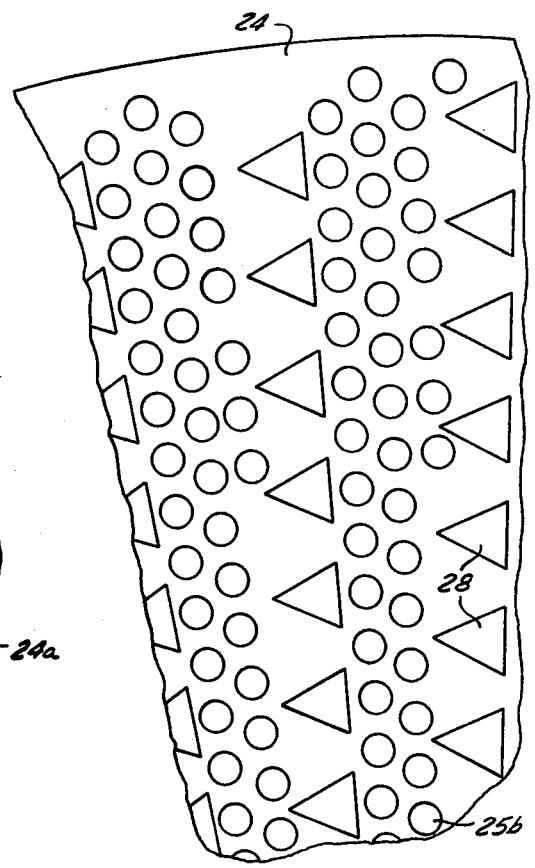
FIG. 5 is a further enlarged side view of a portion of the disc of FIG. 6.
Figure 6:
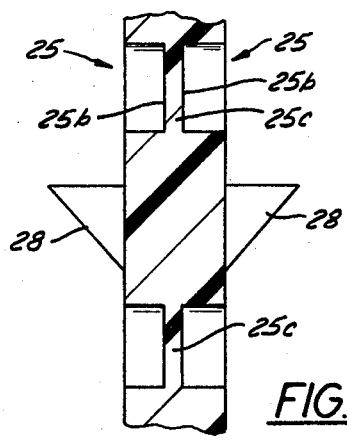
FIG. 6 is a section through two holes of the disc of FIG. 5.

As shown in FIGS. 4–6, each section 24 between the openings 24b and the disc periphery is provided with closely spaced recesses 25. Each recess 25 is defined by a circular side wall and a round wall 25b. The recesses are readily formed in each face of section 24 by round pegs projecting into the mold, not shown. Preferably, but not necessarily, the recesses 25 of each face are similarly placed and paired so that the two inner walls 25b form a web or partition 25c between the recesses.

The approximate size and proportions of each recess is of great importance. In general, the diameter of the recess should be in the order of one-half inch (12.7 mm) and the depth or distance from the face of the disc section to the inner wall 25b should be in the order of three-sixteenths of an inch (4.76 mm). These dimensions are somewhat but not greatly dependent on the actual speed of the disc at the radius selected. A typical disc may have a diameter of up to five feet (1.52 m) of which the lower two feet (0.61 m) may be submerged. A disc of such size generally should rotate at about 60 rpm.

Figure 7:
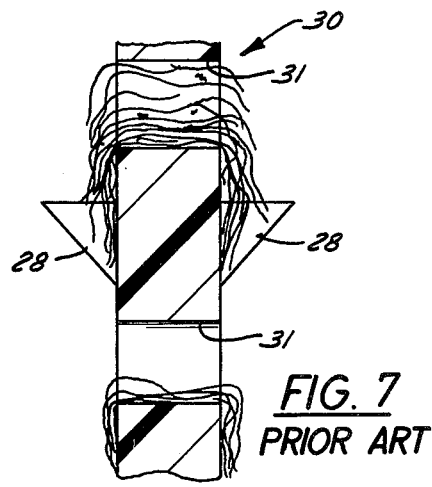
FIG. 7 is a similar section of a prior art disc having holes extending through the disc. The manner in which the holes become plugged is also shown.

The invention may be best understood with reference to the prior art disc 30 which includes a multiplicity of holes 31 or perforations as shown in FIG. 7. The holes shown in that Figure are of the same diameter as that of recess 25; the disc is of the same width or thickness; and the disc has a high efficiency. However, the holes are sometimes subject to clogging, as has been described.

On the other hand, each pair of recesses 25 such as shown in FIG. 6 provides the same degree of aeration directly, but is not subject to clogging, and additionally, the surface areas 25c which define the partition separating the recesses, provide additional aeration of the liquid which wets the surfaces by exposing the liquid to the air with each disc rotation.

This is the contact aeration process which has been mentioned.

U.S. Pat. No. 3,744,774 shows a disc which is provided with a multiplicity of projecting nodules 28. It is the thought of some skilled in the art that a disc which includes the recesses of the present invention and such nodules would also operate with a high efficiency. Such a disc is shown embodying also the present invention. However, such nodules 28 are optional insofar as the present invention is concerned.

With reference to the prior art disc 30 of FIG. 7, which also includes the nodules 28, is provided with the holes 31 which extend through the disc. The contact area of a hole 31 is $2\pi rL$ where r is radius and L is length or disc thickness. The contact area of each two recesses 25 of the disc 23 of the present invention is $2\pi r(L-p)+2\pi r^2$ where p is partition thickness. Thus, $2\pi rL - 2\pi rp + 2\pi r^2$ may be greater than $2\pi pL$ wherever p is less than r. Stated differently, and by comparison, the contact area of the disc 23 is increased to the extent that and provided merely that the thickness of the partition is less than the radius of the hole.

I claim:

1. A rotatable disc for aerating and moving liquid such as sewage in a circular channel and having a hub for mounting on a drive shaft and flat parallel faces normal to the hub axis, said disc being of a diameter and constructed for rotation at speeds such that the air is carried as a gas to below the surface of the liquid, each face having a multiplicity of substantially round recesses of generally equal size, the depth of each recess being greater than one-half of and not greater than the diameter of the recess.

2. The disc of claim 1 having a diameter of in the order of five feet (1.52 m) of which approximately the lower two feet (0.61 m) is to be submerged in the liquid and wherein the diameter of each recess is between one-half (12.7 mm) and three-quarters (19.05 mm) of an inch.

3. The disc of claim 1 wherein the recesses of each face are adjacent to corresponding recesses of the other face such that each two adjacent recesses are separated by an intermediate portion of the disc of nominal thickness measured in the axial direction having reference to the rotation of the disc.

4. The disc of claim 3 wherein the thickness of each such portion between corresponding recesses is less than their radius.

5. The disc of claim 2 wherein the recesses of each face are adjacent to corresponding recesses of the other face such that each two adjacent recesses are separated by an intermediate portion of the disc of nominal thickness measured in the axial direction having reference to the rotation of the disc.

6. The disc of claim 5 wherein the thickness of each such portion between corresponding recesses is less than their radius.

* * * * *